US010069125B2

United States Patent
Yashiki

(10) Patent No.: US 10,069,125 B2
(45) Date of Patent: Sep. 4, 2018

(54) CORE, SEPARATOR ROLL, AND METHOD FOR PRODUCING SEPARATOR ROLL

(71) Applicant: Sumitomo Chemical Company, Limited, Tokyo (JP)

(72) Inventor: Daizaburo Yashiki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/347,243

(22) Filed: Nov. 9, 2016

(65) Prior Publication Data

US 2017/0244083 A1 Aug. 24, 2017

(30) Foreign Application Priority Data

Feb. 24, 2016 (JP) .................. 2016-033630

(51) Int. Cl.
| | | |
|---|---|---|
| *H01M 2/14* | (2006.01) | |
| *B65H 75/10* | (2006.01) | |
| *B65H 75/26* | (2006.01) | |
| *B65H 75/28* | (2006.01) | |
| *B65H 18/00* | (2006.01) | |
| *B65H 35/02* | (2006.01) | |

(Continued)

(52) U.S. Cl.
CPC ............ *H01M 2/145* (2013.01); *B65H 18/00* (2013.01); *B65H 19/28* (2013.01); *B65H 35/02* (2013.01); *B65H 75/10* (2013.01); *B65H 75/265* (2013.01); *B65H 75/28* (2013.01); *H01M 10/0525* (2013.01); *B65H 2301/4148* (2013.01); *B65H 2301/41427* (2013.01); *B65H 2401/115* (2013.01); *B65H 2601/522* (2013.01)

(58) Field of Classification Search
CPC ........ B65H 18/00; B65H 35/02; B65H 75/10; B65H 75/265; B65H 75/28; H01M 10/0525; H01M 2/145
See application file for complete search history.

(56) References Cited

U.S. PATENT DOCUMENTS

2012/0164538 A1 6/2012 Inagaki et al.
2014/0322585 A1 10/2014 Iizuka et al.

FOREIGN PATENT DOCUMENTS

| CN | 102473886 A | 5/2012 |
|---|---|---|
| JP | 2001226041 A | 8/2001 |

(Continued)

OTHER PUBLICATIONS

Office Action dated Aug. 8, 2016 in KR Application No. 2016-0064553.

(Continued)

*Primary Examiner* — Basia Anna Ridley
*Assistant Examiner* — Heng M Chan
(74) *Attorney, Agent, or Firm* — Panitch Schwarze Bellisario & Nadel LLP

(57) ABSTRACT

A core prevents a battery separator wound therearound from moving and becoming misaligned on an outer circumferential surface of the core in a widthwise direction of the core. The core allows a separator to be wound around the outer circumferential surface thereof and is made of resin. The core includes a groove formed on the outer circumferential surface thereof, the groove extending in a direction substantially equivalent to a circumferential direction of the outer circumferential surface.

6 Claims, 10 Drawing Sheets

(51) Int. Cl.
*H01M 10/0525* (2010.01)
*B65H 19/28* (2006.01)

(56) References Cited

FOREIGN PATENT DOCUMENTS

| | | | |
|---|---|---|---|
| JP | 2003-073036 | A | 3/2003 |
| JP | 2004106225 | A | 4/2004 |
| JP | 2007197179 | A * | 8/2007 |
| JP | 3167815 | U | 5/2011 |
| JP | 5022152 | B2 | 9/2012 |
| JP | 2013139340 | A | 7/2013 |
| JP | 2015-115222 | A | 6/2015 |
| KR | 2006-0037844 | A | 5/2006 |
| KR | 2012-0044991 | A | 5/2012 |
| KR | 2015-0049369 | A | 5/2015 |

OTHER PUBLICATIONS

Office Action dated Oct. 4, 2016 in JP Application No. 2016-033630.
Office Action dated Dec. 20, 2016 in KR Application No. 10-2016-0064553.
Office Action dated Feb. 5, 2018 in CN Application No. 201611061860.1.

* cited by examiner

FIG. 6
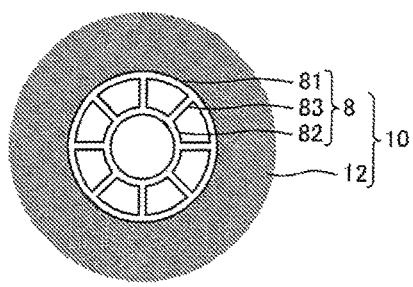
(a)
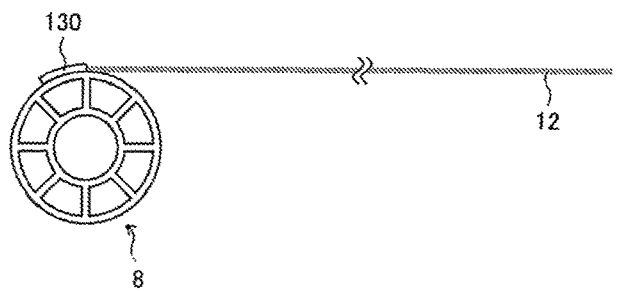
(b)
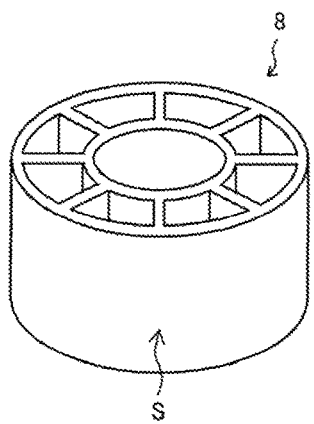
(c)
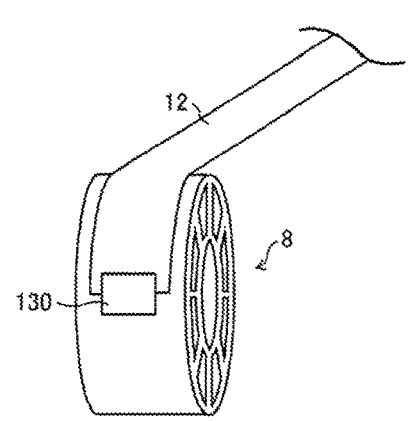
(d)

FIG. 7
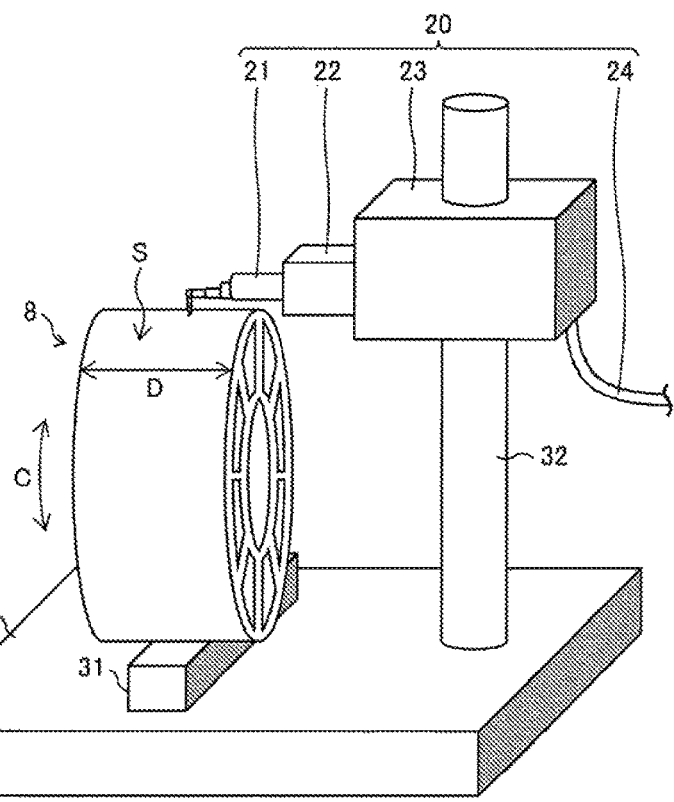
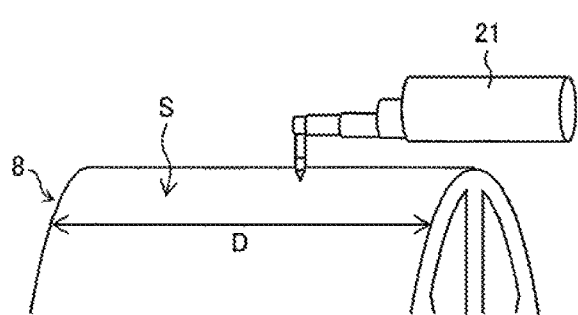

FIG. 10
(a) 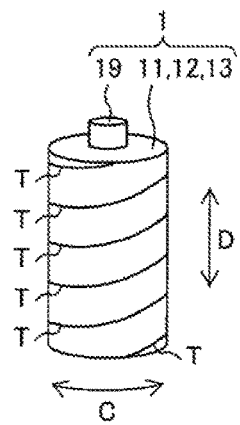
(c) 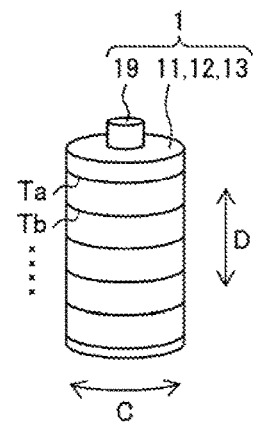
(b) 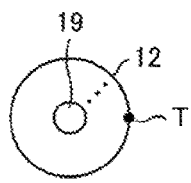
(d) 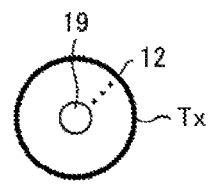

CORE, SEPARATOR ROLL, AND METHOD FOR PRODUCING SEPARATOR ROLL

This nonprovisional application claims priority under 35 U.S.C. § 119 on Patent Application No, 2016-033630 filed in Japan on Feb. 24, 2016, the entire contents of which are hereby incorporated by reference.

TECHNICAL FIELD

The present invention relates to (i) a core having a surface of revolution, around which a separator for use in a battery is to be wound, and (ii) a separator roll obtained by winding a separator for use in a battery around such a core.

BACKGROUND ART

Inside a lithium-ion secondary battery, a cathode and anode are separated by a porous separator. The production of lithium-ion batteries utilizes a separator roll which includes the porous separator and a cylindrical core around which the separator is wound.

Patent Literature 1 discloses (i) a core that includes an electrically conductive component and (ii) a roll composed of a microporous film wound around such a core.

CITATION LIST

Patent Literature

[Patent Literature 1]
Japanese Patent Application Publication, Tokukai No. 2013-139340 (Publication date: Jul. 18, 2013)

SUMMARY OF INVENTION

Technical Problem

During conveyance of a separator roll and during production of a lithium-ion secondary battery, it is preferable that a separator for use in a battery (hereinafter, "battery separator"), which separator is wound around a core, does not become misaligned, on the outer circumferential surface of the core, in a widthwise direction of the core. Patent Literature 1, however, includes no disclosures regarding the prevention of such misalignment.

An object of the present invention lies in preventing a battery separator wound around a core from moving or becoming misaligned, on the outer circumferential surface of a core, in a widthwise direction of the core.

Solution to Problem

In order to solve the above problem, a core according to a first aspect of the present invention is a core a core for allowing a battery separator to fee wound around an outer circumferential surface thereof, including: a groove being formed on the outer circumferential surface so as to extend in a direction substantially equivalent to a circumferential direction of the outer circumferential surface; the core being made of resin.

Furthermore, a separator roll according to a second aspect of the present invention includes the abovementioned core and a battery separator wound around the outer circumferential surface of the core.

Furthermore, a method for producing a separator roll in accordance with a third aspect of the present Invention includes the steps of: (a) preparing a core such that a groove is formed on an outer circumferential surface of the core, the groove extending in a direction substantially equivalent to a circumferential direction of the outer circumferential surface; and (b) winding a battery separator around the outer circumferential surface.

Advantageous Effects of Invention

Each aspect of the present invention yields the advantageous effects of (i) preventing a battery separator, being wound around a core, from moving or becoming misaligned on an outer circumferential surface of the core, in a widthwise direction of the core, and (ii) making it possible to provide a separator roll suitable for conveyance and battery production.

BRIEF DESCRIPTION OF DRAWINGS

FIG. 6 is a schematic view illustrating a configuration of a separator roll in accordance with a reference embodiment of the present invention.

FIG. 7 is a schematic view illustrating a configuration for measuring the surface roughness of the outer circumferential surface of the core shown in FIG. 6.

FIG. 10 is a schematic view illustrating a configuration of a lithium-ion secondary battery including a separator wound off from the core shown in FIG. 8.

DESCRIPTION OF EMBODIMENTS

[Basic Configuration]
The following discusses, in order, a lithium-ion secondary battery, a separator, a heat-resistant separator, a method for producing the heat-resistant separator, a slitting apparatus, and a cutting device.

(Lithium-Ion Secondary Battery)
A nonaqueous electrolyte secondary battery, a lithium-ion secondary battery being a representative example thereof, has a high energy density. Due to this fact, nonaqueous electrolyte secondary batteries are currently widely used in such devices as personal computers, mobile phones, and mobile information terminals, as well as in motorized objects such as automobiles and aircraft. Nonaqueous electrolyte secondary batteries are also widely used as stationary batteries to contribute to a stable supply of power.

Figure 1:
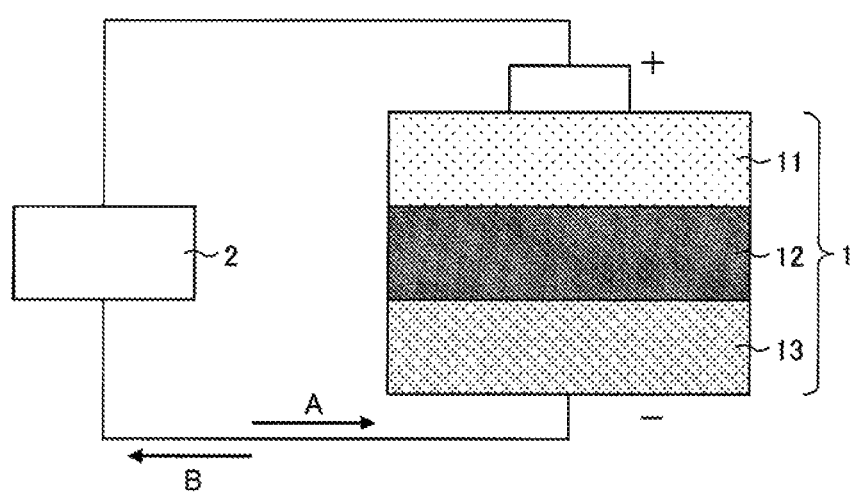
FIG. 1 is a schematic view illustrating a cross sectional configuration of a lithium-ion secondary battery.

FIG. 1 is a schematic view illustrating a cross sectional configuration of a lithium-ion secondary battery 1 (battery).

As illustrated in FIG. 1, the lithium-ion secondary battery 1 includes a cathode 11, a separator 12 (battery separator), and an a node 13. Outside the lithium-son secondary battery 1, an external device 2 is connected to the cathode 11 and the anode 13. While the lithium-ion secondary battery 1 is being charged, electrons move in direction A. On the other hand, while the lithium-ion secondary battery 1 is being discharged, electrons move in direction B.

(Separator)

The separator 12 is arranged such that it is sandwiched between the cathode 11, which is a positive electrode of the lithium-ion secondary battery 1, and the anode 13, which is a negative electrode of the lithium-ion secondary battery 1. The separator 12 is a porous film that separates the cathode 11 and the anode 13 while allowing lithium ions to move therebetween. The separator 12 contains, for example, polyolefin such as polyethylene or polypropylene as a component material.

Figure 2:
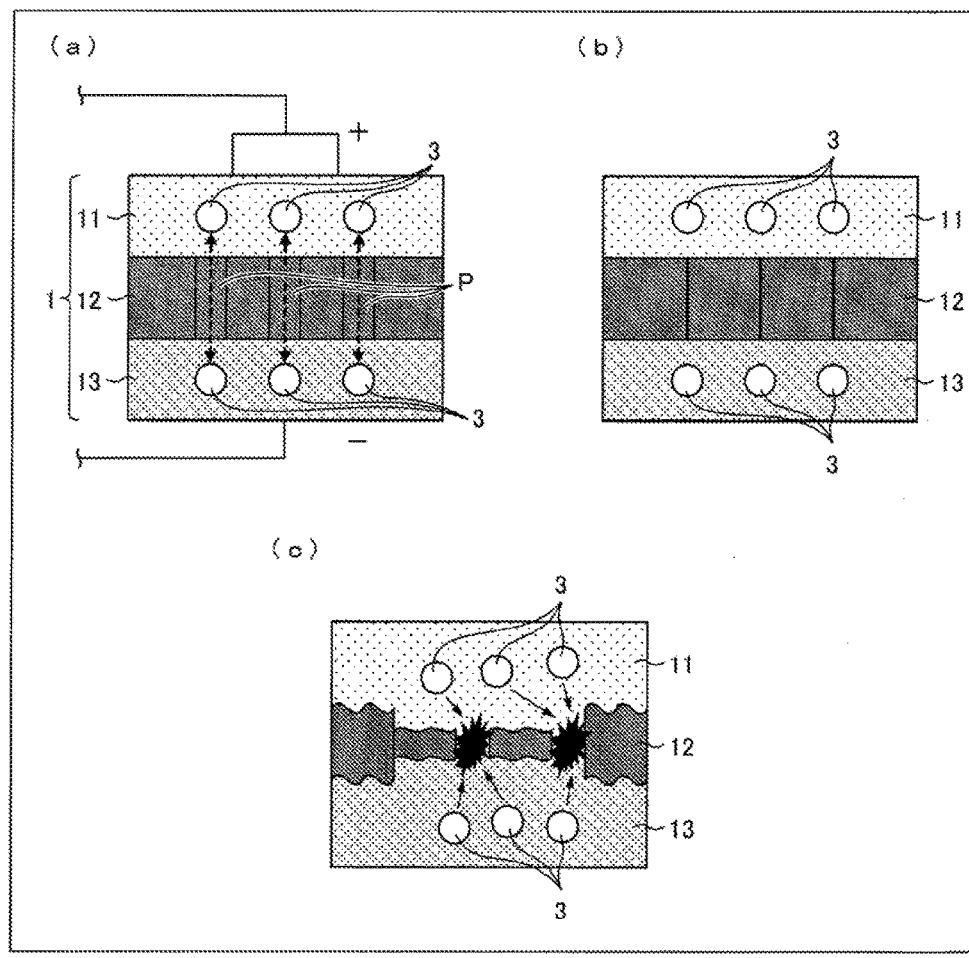
FIG. 2 is a schematic view illustrating details of the configuration of the lithium-ion secondary battery illustrated in FIG. 1.

FIG. 2 is a schematic view illustrating details of the configuration of the lithium-ion secondary battery 1 illustrated in FIG. 1. (a) of FIG. 2 illustrates a configuration of the lithium-ion secondary battery 1 in a normal state. (b) of FIG. 2 illustrates a state in which the temperature of the lithium-ion secondary battery 1 has risen. (c) of FIG. 2 illustrates a state in which the temperature of the lithium-ion secondary battery 1 has risen sharply.

As illustrated in (a) of FIG. 2, the separator 12 is provided with many pores P. Normally, lithium ions 3 in the lithium-ion secondary battery 1 can move back and forth through the pores P.

Note, here, that there are cases in which the temperature of the lithium-ion secondary battery 1 rises due to, for example, excessive charging of the lithium-ion secondary battery 1, a high current caused by short-circuiting of the external device, or other such causes. In such cases, the separator 12 melts or softens, and the pores P are blocked, as illustrated in (b) of FIG. 2. As a result, the separator 12 shrinks. This stops the abovementioned movement of the lithium ions 3, and consequently stops the abovementioned temperature rise.

However, in a case where the temperature of the lithium-ion secondary battery 1 rises sharply, the separator 12 shrinks suddenly. In such a case, as illustrated in (c) of FIG. 2, the separator 12 may be destroyed. The lithium ions 3 would then leak out from the destroyed separator 12. As a result, the lithium ions 3 do not stop moving. Consequently, the temperature of the battery continues rising.

(Heat-Resistant Separator)

Figure 3:
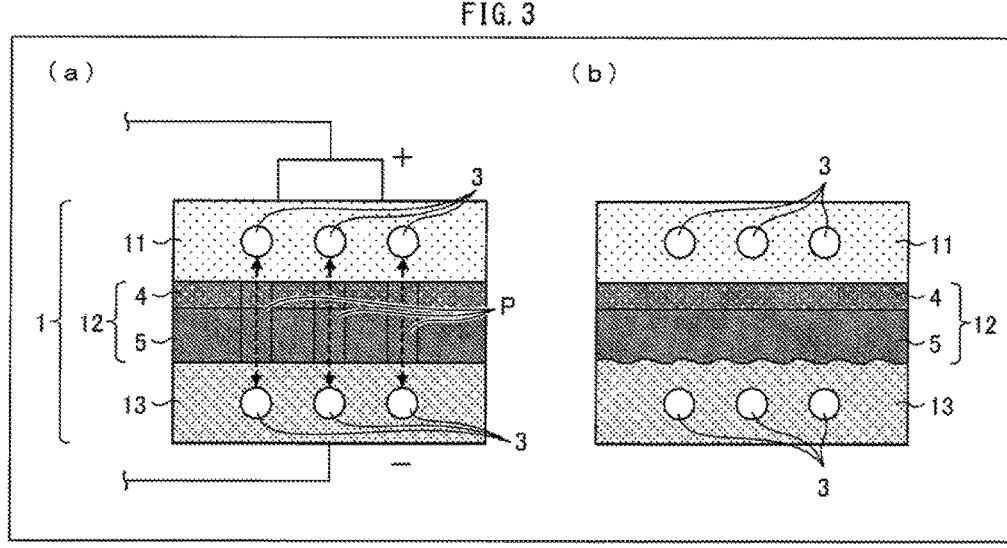
FIG. 3 is a schematic view illustrating another configuration of the lithium-ion secondary battery illustrated in FIG. 1.

FIG. 3 is a schematic view illustrating another configuration of the lithium-ion secondary battery 1 illustrated in FIG. 1. (a) of FIG. 3 illustrates a configuration of the lithium-ion secondary battery 1 in a normal state, and (b) of FIG. 3 illustrates a state in which the temperature of the lithium-ion secondary battery 1 has risen sharply.

As illustrated in (a) of FIG. 3, the separator 12 may be a heat-resistant separator that includes a porous film 5 and a heat-resistant layer 4. The heat-resistant layer 4 is layered upon one surface of the porous film 5, the one surface being on the cathode 11 side. Note that the heat-resistant layer 4 can alternatively be layered upon one surface of the porous film 5, the one surface being on the anode 13 side, or upon both surfaces of the porous film 5. The heat-resistant layer 4 is provided with pores which are similar to the pores P of the separator 12. Normally, the lithium ions 3 move back and forth through the pores P of the separator 12 and the pores of the heat-resistant layer 4. The heat-resistant layer 4 contains, for example, wholly aromatic polyamide (aramid resin) as a component material.

As illustrated in (b) of FIG. 3, even in a case where the temperature of the lithium-ion secondary battery 1 sharply rises and, the porous film 5 melts or softens as a result, the shape of the porous film 5 is maintained because the heat-resistant layer 4 supports the porous film 5. Therefore, such a sharp temperature rise would result in only melting or softening of the porous film 5 and consequent blocking of the pores P. This stops movement of the lithium ions 3 and consequently stops the above-described excessive discharging or excessive charging. In this way, destruction of the separator 12 can be prevented.

(Steps of Production of Heat-Resistant Separator)

A method of producing the heat-resistant separator of the lithium-ion secondary battery 1 is not particularly limited. The heat-resistant separator can be produced using a known method. The following discussion assumes a case where the porous film 5 contains polyethylene as a main component material. However, even in a case where the porous film 5 contains some other material, similar steps can still be used to produce the separator 12.

For example, it is possible to employ a method including (i) a step of forming a film by adding a plasticizer to a thermoplastic resin, and (ii) a subsequent step of removing the plasticizer with an appropriate solvent. For example, in a case where the porous film 5 is made of a polyethylene resin containing ultrahigh molecular weight polyethylene, it is possible to produce the porous film 5 via the following method.

This method includes (1) a kneading step in which a polyethylene resin composition is obtained by kneading an ultrahigh molecular weight polyethylene and an inorganic filler such as calcium carbonate, (2) a rolling step in which a film is formed with the polyethylene resin composition, (3) a removal step in which the inorganic filler is removed from the film obtained in the step (2) above, and (4) a stretching step in which the porous film 5 is obtained by stretching the film obtained in the step (3) above.

Through the removal step, many fine pores are created in the film. The fine pores of the film stretched in the stretching step become the above-described pores P. The porous film 5 formed as a result is a polyethylene microporous film having a prescribed thickness and a prescribed air permeability.

Note that in the kneading step, 100 parts by weight of the ultrahigh molecular weight polyethylene, 5 parts by weight to 200 parts by weight of a low-molecular weight polyolefin having a weight-average molecular weight of 10,000 or less, and 100 parts by weight to 400 parts by weight of the inorganic filler may be kneaded.

Thereafter, in a coating step, the heat-resistant layer 4 is formed on a surface of the porous film 5. For example, on the porous film 5, an aramid/NMP (N-methylpyrrolidine) solution (coating solution) is applied, and thereby, the heat-resistant layer 4 that is an aramid heat-resistant layer is formed. The heat-resistant layer 4 may be provided on only one surface or on both surfaces of the porous film 5. The heat-resistant layer 4 may alternatively be formed with a coating using a mixed solution containing a filler such as alumina/carboxymethyl cellulose.

The method for coating the porous film 5 with a coating solution is not particularly limited as long as it is a method that enables uniform wet coating. The method may be a conventional and well-known method such as a capillary coating method, a spin coating method, a slit die coating method, a spray coating method, a dip coating method, a roll coating method, a screen printing method, a flexo printing method, a bar coater method, a gravure coater method, or a die coater method. The thickness of the heat-resistant layer 4 can be controlled by adjusting (i) the thickness of a coating wet film and (ii) the concentration of solid content in the coating solution.

Note that it is possible to use a resin film, a metal belt, a drum or the like as a support by which the porous film 5 is fixed or conveyed during coating.

As described above, it is possible to produce a separator 12 (heat-resistant separator) in which a heat-resistant layer 4 is layered upon a porous film 5. The separator thus produced is wound around a cylindrical core. Note that the object to be produced via the above production method is not limited to being a heat-resistant separator. The above production method does not necessarily include the coating step, in a case where the production method includes no coating step, the object to be produced is a separator including no heat-resistant layer. Additionally, an adhesion separator including some other functional layer (for example, an adhesion layer as described later) instead of the heat-resistant layer may be produced via the same production method as the heat-resistant separator.

(Slitting Apparatus)

The heat-resistant separator and the separator including no heat-resistant layer (both types of separator hereinafter referred to as "separator") preferably have a width (hereinafter, "product width") suitable for products in which the separator will be utilized, such as the lithium-ion secondary battery 1. However, in order to improve productivity, the separator is produced so as to have a width that is equal to or larger than the abovementioned product width. Then, after having been thus produced, the separator is slit into a separator(s) of a width equal to the product width.

Note that "separator width" means a dimension of the separator in a direction substantially perpendicular to both the lengthwise direction and the thicknesswise direction of the separator. In the description below, a wide separator having not yet been slit is referred to as an "original sheet," while a separator having been slit is specifically referred to as a "slit separator". Note also that here, the term "slit" means to slit the separator in the lengthwise direction (the direction of the flow of the film during production; MD: Machine Direction), and that the term "cut" means to cut the separator in a transverse direction (TD). The transverse direction (TD) means a direction which is substantially perpendicular to the lengthwise direction (MD) and the thicknesswise direction of the separator.

Figure 4:
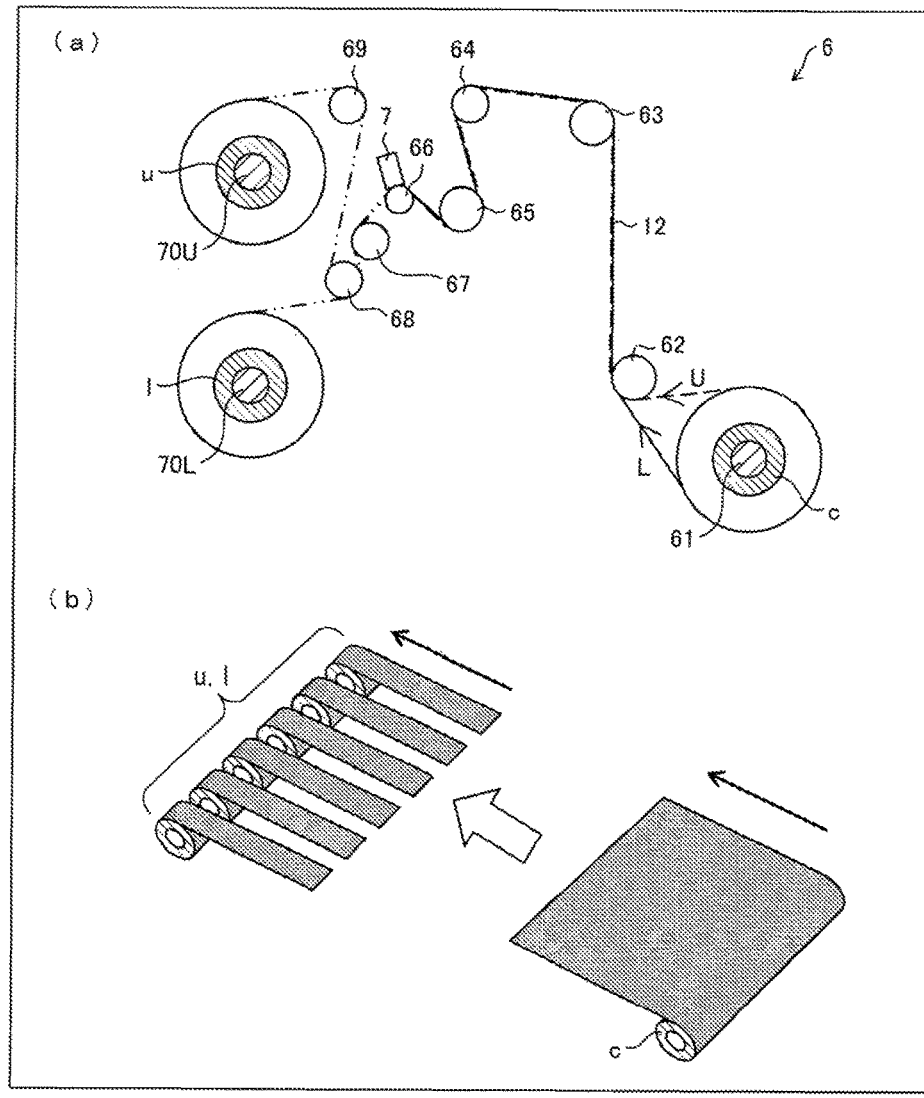
FIG. 4 is a schematic view illustrating a configuration of a slitting apparatus for slitting a separator.

FIG. 4 is a schematic view illustrating a configuration of a slitting apparatus 6 for slitting a separator. (a) of FIG. 4 illustrates an overall view of a configuration of a slitting apparatus, and (b) of FIG. 4 illustrates configurations before and after slitting the original sheet.

As illustrated in (a) of FIG. 4, the slitting apparatus 6 includes a cylindrical wind-off roller 61 that is supported such that it can rotate, rollers 62 to 69, and take-up rollers 70U and 70L. The slitting apparatus 6 is further provided with a cutting device 7 described later.

(Before Slitting)

In the slitting apparatus 6, a cylindrical core c around which the original sheet is wound is fit on the wind-off roller 61. As illustrated in (b) of FIG. 4, the original sheet is wound off from the core e to route U or route L. The original sheet thus wound off is conveyed to the roller 68 via the rollers 68 to 67. During the step of conveying the unwound original sheet, the original sheet is slit into a plurality of slit separators.

(After Slitting)

As illustrated in (b) of FIG. 4, some of the slit separators are each wound around cylindrical cores u (bobbins) fit on the take-up roller 70U. Meanwhile, the other slit separators are each wound around cylindrical cores 1 (bobbins) fit on the take-up roller 70L. Note that each of the separators wound into a roll form is referred to as a "separator roll."

(Cutting Device)

Figure 5:
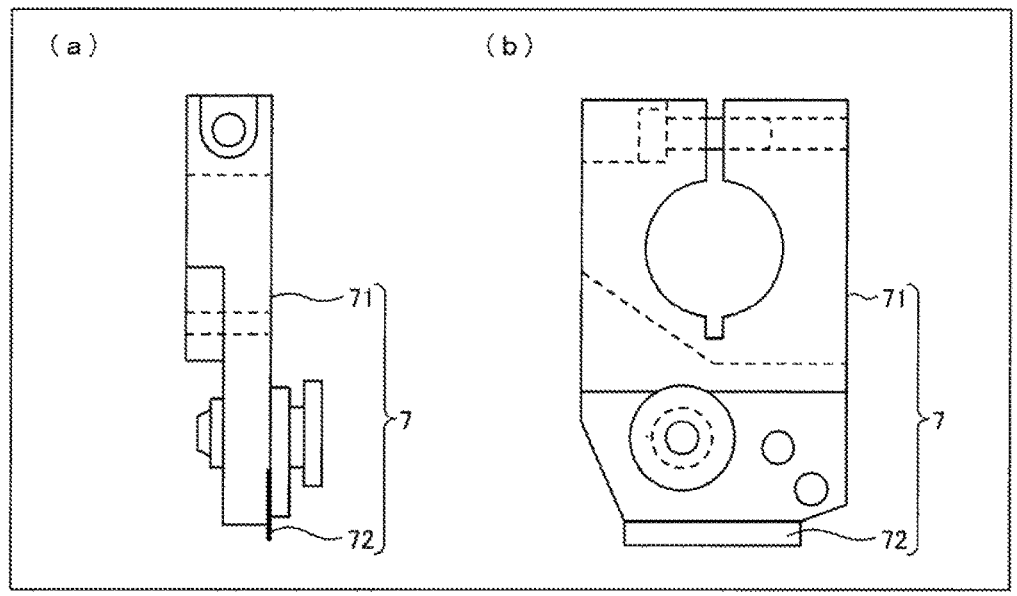
FIG. 5 is a combination of a side view and a front view illustrating a configuration of a cutting device of the slitting apparatus illustrated in FIG. 4.

FIG. 5 illustrates a configuration of the cutting device 7 of the slitting apparatus 6 illustrated in (a) of FIG. 4. (a) of FIG. 5 is a side view of the cutting device 7, and (b) of FIG. 5 is a front view of the cutting device 7.

As illustrated in (a) and (b) of FIG. 5, the cutting device 7 includes a holder 71 and a blade 72. The holder 71 is fixed to a housing or the like provided in the slitting apparatus 6. The holder 71 holds the blade 72 in a manner such that the blade 72 and the original sheet of the separator being conveyed have a fixed positional relation. The blade 72 (i) has a finely sharpened edge and (ii) slits the original sheet of the separator by using the edge.

(Reference Embodiment)

<<Configuration of Separator Roll>>

FIG. 6 is a schematic view illustrating a configuration of a separator roll 10 according to a reference embodiment of the present invention. (a) of FIG. 6 shows a separator 12 in a state before being wound off a core 8. (b) of FIG. 6 shows the separator 12 in a state in which it has been wound off from the core 8. (c) of FIG. 6 shows the core 8 in a state after the separator 12 has been wound off and removed. (d) of FIG. 6 shows the illustration of (b) of FIG. 6 from a different angle.

As is shown in (a) of FIG. 6, the separator roll 10 includes a core 8 with a separator 12 wound thereon. The separator 12 is one of the slit separators into which the original sheet of the separator has been slit as described above.

(Core)

The core 8 includes an outer cylindrical part 81, an inner cylindrical part 82, and ribs 83. The core 8 has the same function as the cores u and 1 mentioned above.

The outer cylindrical part 81 is a cylindrical member for winding a separator 12 around the outer circumferential surface of the outer cylindrical part 81. The inner cylindrical part 82 is a cylindrical member for fitting a take-up roller to the inner circumferential surface of the inner cylindrical part 82. The ribs 83 are support members that support the outer cylindrical part 81 from the inner circumferential surface thereof, the ribs 83 extending between the inner circumferential surface of the outer cylindrical part 81 and the outer circumferential surface of the inner cylindrical part 82.

A material for the core 8 includes ABS resin. However, the material for the core according to the present invention is not limited to the above. The material for the core may include resins other than ABS resin, such as polyethylene resin, polypropylene resin, polystyrene resin, and vinyl chloride resin. It is preferable that metal, paper, and/or fluorocarbon resin are not used as the material for the core.

(Separator)

One end of the separator 12 is affixed to the core 8 via adhesive tape 130. Specifically, the abovementioned one end of the separator 12 is fixed to the outer circumferential surface S of the core 8 via adhesive tape 130, the adhesive tape 130 including an adhesive agent. The one end of the separator may be fixed to the outer circumferential surface S by means of directly applying an adhesive to the abovementioned one end of the separator 12, by using a clip, or in some other way other than using the adhesive tape 130.

Unevenness of the outer circumferential surface of the core 8 is transferred to the separator 12.

(Surface Roughness of the Core)

FIG. 7 is a schematic view illustrating a method for measuring, for example, (i) the surface roughness of the outer circumferential surface S of the core 8 shown in (c) of FIG. 6 and (ii) an average peak-to-peak distance of the core 8. (a) of FIG. 7 is an overall view of a configuration. (b) of FIG. 7 illustrates a configuration of a peripheral portion of a measurement head 21. As shown in (a) and (b) of FIG. 7, the surface roughness of the outer circumferential surface S and other qualities of the core 8 can be measured using a surface roughness measurement apparatus 20. As shown in (a) of FIG. 7, the core 8 is kept in a fixed position on a mount 30 via a chock 31.

The surface roughness measurement apparatus 20 includes a measurement head 21, a movement mechanism 22, a housing 23, and a cable 24. The surface roughness measurement apparatus 20 is fixed to the mount 30 via a fixing member 32.

The tip of the measurement head 21 is in contact with the outer circumferential surface S. The movement mechanism 22 moves the measurement head 21 in direction D, the width direction of the core 8.

The housing 23 includes a module that (i) receives a signal corresponding to the surface roughness of the outer circumferential surface S from the measurement head 21, then (ii) calculates the surface roughness based on the signal thus received. The cable 24 relays electrical power and a result of the surface roughness calculation between the surface roughness measurement apparatus 20 and an external device.

(Specifications of Core Surface Roughness Measurement Apparatus)

When performing measurement of core surface roughness Ra and average peak-to-peak distance as shown in Table 1 below, the "Surftest (SJ-400)" manufactured by Mitutoyo was used as the surface roughness measurement apparatus 20. The tip of the probe of the measurement bead 21 is cone-shaped, with an angle of 60 degrees. The radius of the tip of the probe is 2 μm. In the present reference embodiment, the surface roughness measurement apparatus 20 was set to the following settings. Measurement force=0.75 mN; measurement, speed=0.5 mm/s; evaluation length=4.0 mm; cutoff value=0.8 mm.

(Production of Separator Including Functional Layer)

<Product Ion of Polyolefin Porous Film>

A polyolefin porous film was produced as follows. High molecular weight polyethylene powder (GUR4032; manufactured by Ticona) was mixed with polyethylene wax having a weight-average molecular weight of 1,000 (FNP-0115; manufactured by Nippon Seiro Co., Ltd.) at a weight ratio of 70% to 30%, respectively. A total of 100 parts, by weight of the mixture of high molecular weight polyethylene and polyethylene wax was then mixed with (i) 0.4 parts by weight of an oxidation inhibitor (Irg1010; manufactured by Ciba Specialty Chemicals), (ii) 0.1 parts by weight of another oxidation inhibitor (P168; manufactured by Ciba Specialty Chemicals), and (iii) 1.3 parts by weight of sodium stearate. To the mixture, calcium carbonate (manufactured by Maruo Calcium Co., Ltd.) having an average particle diameter of 0.1 μm was added such that the calcium carbonate constituted 38% of the whole mixture by volume. The resulting mixture was mixed in powder form in a Henschel mixer and was subsequently melt-kneaded in a biaxial kneader to obtain a polyolefin resin composition. The polyolefin resin composition was rolled into a sheet using a pair of rollers at a surface temperature of 150° C. Calcium carbonate was removed from the sheet by immersing the sheet in an aqueous hydrochloric acid solution (4 mol/L of hydrochloric acid, 0.5% by weight of nonionic surfactant). The sheet was then drawn at 105° C. by a factor chosen as necessary into a polyolefin porous film with a film thickness of 13.5 μm.

<Production of Slurry for Formation of Functional Layer>

The conditions of production of para-aramid for providing a heat-resistant functional layer are as follows.

A para-aramid (poly(paraphenylene terephthalamide)) was produced using a separable flask, the separable flask having a capacity of 3 L and having a stirring blade, a thermometer, a nitrogen inflow tube, and an opening for adding powder. After the separable flask was fully dried, 2,200 g of N-methyl-2-pyrrolidone (NMP) was placed therein. Subsequently, 151.07 g of calcium chloride powder that had been vacuum-dried for 2 hours at 200° C. was added to the NMP. The temperature of the mixture was raised to 100° C. to completely dissolve the calcium chloride was into the NMP. The resultant calcium chloride solution was returned to room temperature, after which 68.23 g of para-phenylenediamine was added and completely dissolved. While the resulting solution was kept at 20° C.±2° C., 124.97 g of terephthalic acid dichloride was added to the solution. In doing so the terephthalic acid dichloride was divided into 10 equal portions that were added one at a time at 5-minute intervals. Thereafter, the resulting solution was allowed to mature for one hour while being stirred and kept at 20° C.±2° C., resulting in a para-aramid solution with a para-aramid concentration of 6% by weight.

To 100 g of the obtained para-aramid solution, 243 g of NMP was added. The mixture was stirred for 60 minutes to obtain a para-aramid solution with a para-aramid concentration of 1.75% by weight. Separately, 6 g of alumina powder (Alumina C; manufactured by Nippon Aerosil Co., Ltd.; true specific gravity: 3.2 g/cm$^3$) was mixed with 6 g of another alumina powder (Advanced Alumina AA-03; manufactured by Sumitomo Chemical Co., Ltd.; true specific gravity: 4.0 g/cm$^3$) to obtain 12 g of an alumina powder mixture. Into the para-aramid solution with a para-aramid concentration of 1.75% by weight, 12 g of this alumina powder mixture thus obtained was mixed, and the resulting mixture was stirred for 240 minutes to obtain an alumina powder-containing para-aramid solution. The alumina powder-containing para-aramid solution thus obtained was filtered using a 1000-mesh metal screen. Thereafter, 0.73 g of calcium oxide was added to the filtrate, followed by 240 minutes of stirring to achieve neutralization. Finally, defoaming of the mixture was performed under reduced pressure to obtain a slurry.

<Production of Layered Separator>

A polyolefin porous film (width: 300 mm, length: 300 m) was mounted onto a wind-off machine. Subsequently, the polyolefin porous film was drawn out from the wind-off machine, and one side of the drawn out polyolefin porous film was coated with the above-described slurry by means of a bar coater to obtain a coated film. Next, the coated film thus obtained was passed through a vessel of constant temperature and humidity (temperature: 50° C., relative humidity: 70%) to precipitate para-aramid from the layer coated on the film. The resulting film was then passed through a water washing device via which NMP and calcium chloride were removed from the film.

Thereafter, moisture was removed from the washed film by blowing hot air from a dryer onto the film, while passing the film through heated rollers. Thus, a layered separator of 17 μm in thickness was obtained, the layered separator including (i) a polyolefin porous film and (ii) a heat-resistant layer (a functional layer) layered upon one side of the polyolefin porous film.

The layered separator thus obtained was slit into pieces of 60 mm in width. The pieces were then wound around cores to prepare rolls with the heat-resistant layer facing the inner side (the core side). A winding tension of 1,900 gram-force was used. The rolls were stored at room temperature for two weeks. Thereafter, the surface roughness of the polyolefin side (the outer side) of the film was measured in a direction orthogonal to the circumferential direction of the film. The measurement was made for an innermost layer (1st layer) of the film being unwound from the roll form.

(Specifications of the Measurement Apparatus)

The surface roughness Ra of each separator as shown in Table 1 below was measured using a non-contact surface shape measurement system (VertScan [registered trademark] 2.0 R5500GML, made by Ryoka Systems Inc.). The measurement conditions are as follows.

Objective lens; 5× (Michelson type)
Intermediate lens: 1×
Wavelength filter: 530 nm
CCD camera: ⅓ inch
Measurement mode: Wave
Image field of view: 700 μm (in a direction orthogonal to the circumferential direction)×940 μm (in the circumferential direction)
Number of connected images: 5, in a direction orthogonal to the circumferential direction.
Horizontal correction of data: Quartic
Cutoff: None

[Embodiment]

In the following description, members having the same function as aforementioned members have been given identical reference numbers.

<<Configuration of Separator Roll>>

Figure 8:
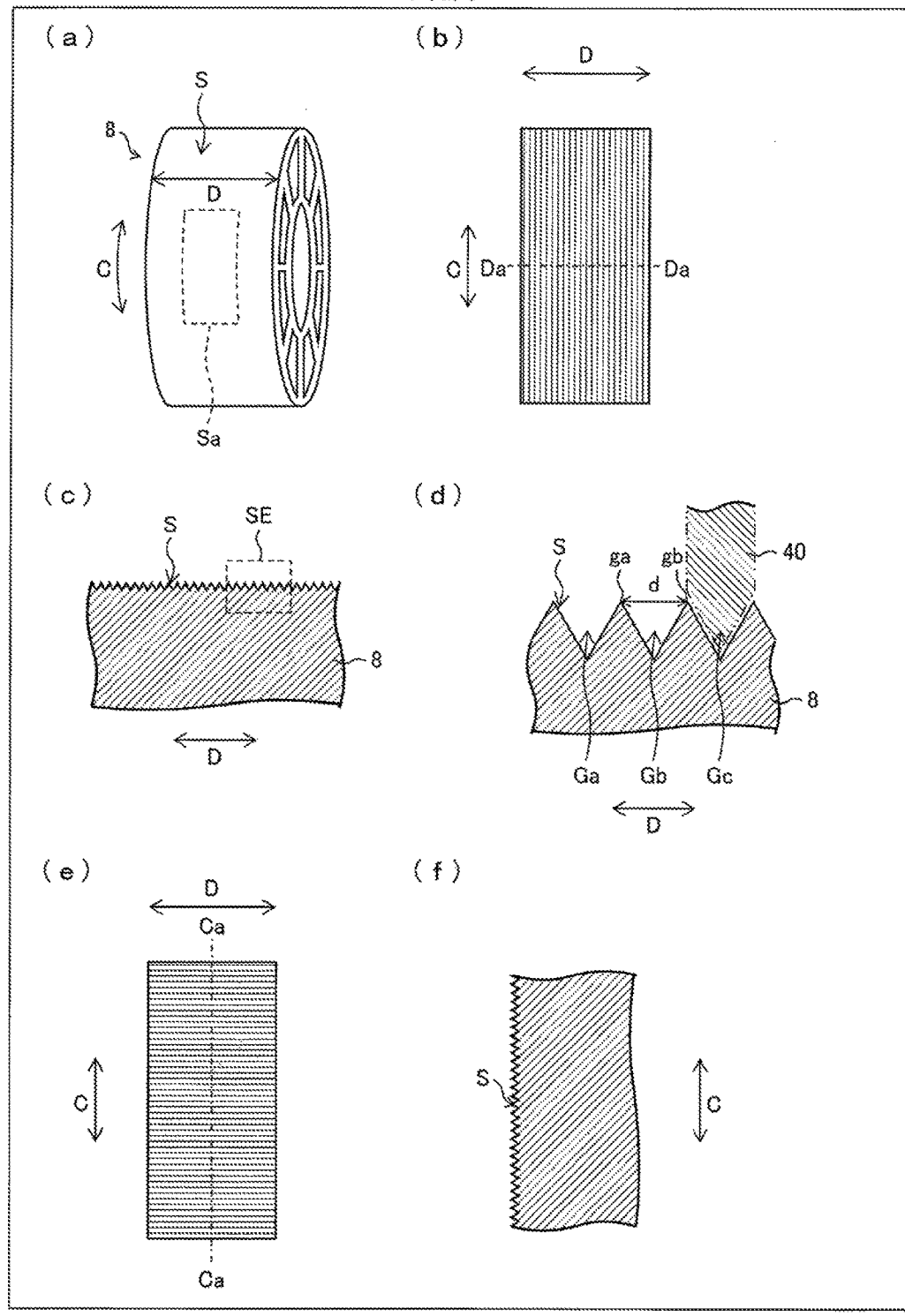
FIG. 8 is a schematic view illustrating a configuration of a core of a separator roll in accordance with an embodiment of the present invention.

FIG. 8 is a schematic view illustrating a configuration of a core 8 of a separator roll in accordance with an embodiment of the present invention. (a) of FIG. 8 illustrates a configuration of the core 8 in its entirety. Direction C is a circumferential direction of an outer circumferential surface S of the core 8. Direction D is, as described above, a widthwise direction of the core 8, i.e., a direction orthogonal to direction C.

(b) of FIG. 8 is an enlarged view illustrating an area Sa of the outer circumferential surface S of the core 8 illustrated in (a) of FIG. 8. (c) of FIG. 8 is a cross-sectional view illustrating a cross section Da-Da of the outer circumferential surface S illustrated in (b) of FIG. 8. A groove is formed on the outer circumferential surface S so as to extend substantially in direction C. That is, the groove extends in a direction substantially equivalent to direction C. Here, the "direction substantially equivalent to direction C" means a direction that is substantially parallel to direction C, and more specifically, does not deviate from direction C by more than 10 degrees.

(d) of FIG. 8 is an enlarged view illustrating an area SE of the cross section Da-Da illustrated in (c) of FIG. 8. Portions Ga through Gc of the groove (hereinafter referred to as "groove portions") are formed on the outer circumferential surface S. Peaks ga and gb form the two ends of groove portion Gb with respect to direction D. Peak ga is formed between groove portion Gb and groove portion Ga, and peak gb is formed between groove portion Gb and groove portion Gc. Hereinafter, a distance d between peak ga and peak gb, measured in direction D, will be referred to as the "peak-to-peak distance" of groove portion Gb.

(Characteristics of Outer Circumferential Surface of Core)

TABLE 1

| | Groove pattern direction | Coefficient of static friction | Average peak-to-peak distance (μm) | Ra of core (μm) | Ra of separator (μm) | |
|---|---|---|---|---|---|---|
| | | | | | Reference | 1st layer |
| Example 1 | C | 0.28 | 62 | 0.5 | 0.3 | 0.4 |
| Example 2 | C | 0.31 | 233 | 13 | 0.3 | 2.0 |
| Example 3 | C | 0.28 | 234 | 4.7 | 0.3 | — |
| Example 4 | C | 0.31 | 468 | 5.4 | 0.3 | 1.9 |
| Example 5 | C | — | 233 | 5.2 | 0.3 | 1.2 |
| Comparative Example 1 | D | 0.20 | 229 | 13 | 0.3 | — |
| Coraparative Example 2 | D | 0.20 | 230 | 4.5 | 0.3 | — |

Table 1 indicates the properties of respective outer circumferential surfaces of various cores. The "Groove pattern direction" column indicates in which direction a groove extends, the groove being formed on the outer circumferential surface of each core. A letter "C" indicates a direction substantially equivalent to direction C, whereas a letter "D" indicates direction D.

The "Coefficient of static friction" column indicates a value equal to F/P, F being the maximum frictional force of a core not in motion, P being the normal force. The frictional force is a force that acts along the outer circumferential surface of a core when an attempt is made to put the core in motion in a manner that would create friction between the core and another object. The direction of the frictional force is orthogonal to the circumferential direction of the outer circumferential surface of the core. The normal force is a force that acts on the outer circumferential surface of a core when an attempt is made to put the core in motion in a manner that would create friction between the core and another object. The direction of the normal force is a direction normal to the outer circumferential surface.

The "Average peak-to-peak distance" column indicates an average of the peak-to-peak distance of groove portions formed on the outer circumferential surface of a core. The "Ra of core" column indicates the arithmetic mean roughness of the outer circumferential surface of a core. The "Ra of separator" column indicates the arithmetic mean roughness of a surface of a separator. The "Reference" column indicates the arithmetic mean roughness of the surface of a separator that has not been wound around the outer circumferential surface of a core. The "1st layer" column indicates the arithmetic mean roughness of a part of a separator wound around the outer circumferential surface of a core, which part comes into contact with the outer circumferential surface of the core.

In each of Examples 1 to 5 and Comparative Examples 1 and 2 shown in Table 1, an ABS core measuring 152 mm in diameter and 65 mm in width was used.

(Groove Pattern)

Grooves formed on the outer circumferential surface of each of the cores of Examples 1 to 5 extend in a direction substantially equivalent to direction C, as illustrated in (b) and (c) of FIG. 8.

(e) of FIG. 8 is an enlarged view illustrating a part of an outer circumferential surface of a core, which core is a Comparative Example for comparison with the core 8 shown in (a) of FIG. 8. (f) of FIG. 8 is a cross-sectional view illustrating a cross section Ca-Ca of the outer circumferential surface illustrated in (e) of FIG. 8. The groove formed on the outer circumferential surface of each of the cores of Comparative Examples 1 and 2 extends in a direction substantially equivalent to direction D, as illustrated in (e) and (f) of FIG. 8.

(Coefficient of Static Friction)

Figure 9:
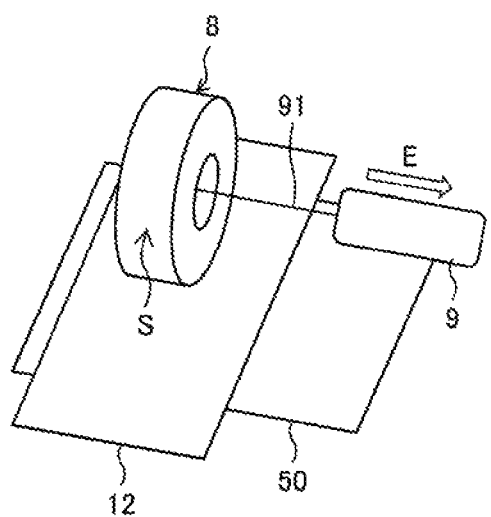
FIG. 9 is a schematic view illustrating a method for measuring the coefficient of static friction between (i) the outer circumferential surface of the core shown in FIG. 8 and (ii) a separator.

FIG. 9 is a schematic view illustrating a method for measuring the coefficient of static friction between the core 8 and the separator 12 shown in (a) of FIG. 8, the static friction being in a direction orthogonal to the circumferential direction of the outer circumferential surface S of the core 8. The core 8 is positioned on top of the separator 12. The separator 12 is positioned on top of a sheet of black paper 50 (made by Hokuetsu Kishu Paper Co., Ltd.; type: wood-free colored paper; color: black; thickness: "saiatsukuchi"; size: "shirokuban"; grain: long). The black paper 50 is positioned on top of a substantially flat surface of a substantially rigid base. The outer circumferential surface S of the core 8 is in contact with the separator 12.

The core 8 is connected to a force gauge 9 (made by Imada Co., Ltd.; Economical Model Digital Force Gauge DS2-50N) via a connecting member 91. The connecting member 91 is a substantially un-stretchable string-like member. One end of the connecting member 91 is connected to the core 8, while the other end is connected to the force gauge 9. The force gauge 9 is able to display the amount of force applied to the portion of the force gauge 9 connected to the connecting member 91.

(Details of Procedure of Measurement of Coefficient of Static Friction)

The force gauge 9 is moved in direction E, away from the core 8. During measurement, direction E is maintained so as to be orthogonal to the circumferential direction of the outer circumferential surface S of the core 8. The connecting member 91 is kept in a state in which it is both (i) straight and (ii) substantially parallel to the black paper 50. Under these conditions, the amount of force displayed by the force gauge 9 is substantially equivalent to the amount of force acting along the outer circumferential surface S of the core 8 in a direction orthogonal to the circumferential direction of the outer circumferential surface S.

Thus, via the above-described method, it is possible to use the force gauge 9 to measure frictional force acting along the outer circumferential surface S of the core 8 when an attempt is made to move the core 8 in a manner that would create friction between the core 8 and the separator 12, the frictional force being in a direction orthogonal to the circumferential direction of the outer circumferential surface S.

The coefficients of static friction shown in Table 1 were calculated via the formula F/P in Examples 1 to 5 and Comparative Examples 1 and 2, in which their respective cores were used as the core 8. Here, F is the amount of the aforementioned frictional force measured with the force gauge 9 in accordance with the measurement method illustrated in FIG. 9. P is the amount of normal force acting on the outer circumferential surface of each core in a direction normal to the outer circumferential surface of the core.

(Average Peak-to-Peak Distance and Ra of Core)

"Average peak-to-peak distance" and "Ra of core" as indicated in Table 1 were measured using the surface roughness measuring apparatus 20 as shown in the measurement method illustrated in FIG. 7. For Comparative Examples 1 and 2, the average peak-to-peak distance and the Ra of core were measured via the measurement method illustrated in FIG. 7, but the core 8 and the chock 31 were first rotated 90 degrees.

<<Effects of the Present Embodiments>>

In Table 1, the groove pattern direction of the cores of Examples 1 to 5 (hereinafter, "Example Cores") is direction C, whereas the groove pattern direction of the cores of Comparative Examples 1 and 2 (hereinafter, "Comparative Example Cores") is direction D. This causes the coefficient of static friction of Examples 1 to 5 to be greater than that of Comparative Examples 1 and 2, the static friction being produced (i) between each core and the separator 12 and (ii) in a direction orthogonal to the circumferential direction of the outer circumferential surface of each core, i.e., a width wise direction of each core. As such, the Example Cores yield the advantageous effect of better preventing, in comparison to the Comparative Example Cores, the separator 12 wound therearound from moving and becoming misaligned on the outer circumferential surface.

Note that in order to yield the above effect, the coefficient of static friction between the core and the separator 12, in a width wise direction of the core, falls within the range from 0.21 to 0.5. In a case where the coefficient of static friction exceeds 0.5, adjusting the alignment of the separator on the core, at the time of winding commencement, becomes markedly difficult. Maintaining the coefficient of static friction to be less than or equal to 0.5 creates suitable amount of slippage, thereby enabling easy adjustment of alignment.

(Effects Yielded by Average Peak-to-Peak Distance)

In Table 1, the average peak-to-peak distance of each Example Core falls within the range from 50 μm to 500 μm. This makes it possible to achieve a coefficient of static friction that is adequately large with respect to a standard in the field of separator rolls, the static friction being produced (i) between the Example Core and the separator 12 and (ii) in a width wise direction of the Example Core.

Here, the "standard in the field of separator rolls" refers to, for example, a given value of coefficient of static friction produced between a separator and a core of a separator roll and in a widthwise direction of the core, which value must be exceeded to achieve a given effect.

For example, while a separator roll is being conveyed or used to manufacture a battery, it is preferable that the separator does not move and become misaligned on the outer circumferential surface of the core, even in a case where an accelerative force of 10 m/s² is applied to the separator roll. In a case where the coefficient of static friction produced between the core and separator of the separator roll and in a width wise direction of the core exceeds 0.2, the separator will not slip on the outer circumferential surface of the core even in a case where an accelerative force of 10 m/s² is applied to the separator roll.

Furthermore, in Table 1, each Example Core has an average peak-to-peak distance of 468 μm or less. This makes it possible to keep the Ra of a separator wound around the Example Core less than or equal to 2.0 μm on the "1st layer." In order to achieve a lesser depth of an impression left by the transfer of a pattern of unevenness of a core surface into a separator wound around the core, the average peak-to-peak distance of the Example Core is preferably 400 μm or less, more preferably 250 μm or less, and still more preferably 100 μm or less. In particular, in a case where a core has an average peak-to-peak distance of 250 μm or less, the depth of an impression left by transfer of a pattern of unevenness of the core surface into a separator wound around the core is reduced markedly.

In a case where a core has a large average peak-to-peak distance, the area of contact between the outer circumferential surface of the core and a separator wound therearound will be correspondingly decreased. This causes an increase in the amount of pressure applied to each groove peak when a separator is wound around the outer circumferential surface of the core. In such a case, there will be a tendency toward an increased depth of an impression left by transfer of a pattern of unevenness of the core surface into the separator wound around the core.

For example, in Table 1, the "Ra of core" of Example 4 is approximately equal to the "Ra of core" of Example 5. However, in Example 4, whose average peak-to-peak distance is comparatively large, the value of "Ra of separator" of the "1st layer" is greater than that of Example 5.

Note that with a separator having a deeper impression left by transfer of a pattern of unevenness of a core surface, there will be an increased likelihood of a problem occurring when the separator is used in the manufacture of a product such as a battery. Thus, winding a separator around a core whose outer circumferential surface exhibits unevenness greater than a given standard (such a core hereinafter referred to as an "uneven core") renders a portion of the separator unfit for use as a product. In a case where a separator is wound around an uneven core, transfer of a pattern of unevenness of the core surface leaves a comparatively deeper impression into a portion of the separator proximal to the core surface, thereby creating a longer "throwaway portion" of the separator. As such, it is not preferable to use an uneven core in a separator roll.

(Effects Yielded by Ra of Core)

In Table 1, the "Ra of core" of Examples 1 to 5 and Comparative Examples 1 and 2 (hereinafter collectively referred to as "every core") falls within the range from 0.1 μm to 50 μm. This makes is possible to achieve a coefficient of static friction that is adequately large with respect, to the aforementioned standard in the field of separator rolls, the static friction being produced (i) between each core and the separator 12 and (ii) in a direction orthogonal to the groove direction of each core.

However, as described above, in a case where a separator moves and becomes misaligned on the outer circumferential surface of a core, the separator tends to move in a widthwise direction of the core. As such, the groove pattern direction is preferably direction C, as in the Example Cores. That is, it is preferable that (i) a groove formed on the outer circumferential surface of the core extends in a direction substantially equivalent to the circumferential direction of the core and (ii) the "Ra of core" falls within the range from 0.1 μm to 50 μm. In a case where the Ra of core exceeds 50 μm, there tends to be a marked increase in depth of an impression left by transfer of a pattern of unevenness of the core surface into a separator wound around the core.

The "Ra of core" is preferably not less than 0.3 μm and more preferably not less than 0.5 μm. In a case where the Ra of core is not less than 0.3 μm, if becomes possible to achieve a more adequately large coefficient of static friction produced between the core and the separator 12 and in a widthwise direction of the core. Additionally, the "Ra of core" is more preferably not greater than 30 μm, still more preferably not greater than 15 μm, further preferably not greater that 10 μm, and still further preferably not greater than 5 μm. In a case where the Ra of core is not greater than 30 μm, it becomes possible to better suppress an impression left by transfer of a pattern of unevenness of the core surface into a separator wound around the core. That is, the Ra of core preferably falls within the range from 0.3 μm to 30 μm, and more preferably falls within the range from 0.5 μm to 15 μm.

(Effects Yielded by Groove Configuration)

FIG. 10 is a schematic view illustrating a configuration of a lithium-ion secondary battery 1 including the separator 12 wound off from the core 8 shown in (a) of FIG. 8. The lithium-ion secondary battery 1 further includes a winding core 19 in addition to the aforementioned cathode 11, separator 12, and anode 13.

The separator 12 is wound around the winding core 19 so as to form layers. The cathode 11 and anode 13 are sandwiched between the layers formed by the separator 12.

(a) of FIG. 10 illustrates a configuration in which a spiral impression of unevenness T is formed on the separator 12 of the lithium-ion secondary battery 1. The impression of unevenness T is caused by transfer of a groove formed on the outer circumferential surface S of the core 8 to the separator 12 wound therearound.

As illustrated in (d) of FIG. 8, groove portions Ga-Gc are formed by placing a cutting blade 40 against the outer circumferential surface S of the core 8 and then rotating the core 8. In the cross section illustrated in (d) of FIG. 8, the cutting blade 40 is moved, in direction D, from the position of groove portion Ga to the position of groove portion Gh during the time it takes the core 8 to make a single rotation. This forms groove portion Ga and groove portion Gb as a continuous spiral groove on the outer circumferential surface S of the core 8. The cutting blade 40 is then moved, in the same manner, from the position of groove portion Gb to the position of groove portion Gc, thereby lengthening the spiral groove in direction D. The spiral groove can be lengthened so as to cover the entire width of the core 8 by continuing to move the cutting blade 40 in the same manner.

The impression of unevenness T on the separator 12 of the lithium-ion secondary battery 1 as illustrated in (a) of FIG. 10 is caused by transfer of a pattern of the spiral groove extending along the entire width of the core 8. Directions C and D of the lithium-ion secondary battery 1 as illustrated in (a) of FIG. 10 correspond, respectively, to directions C and D of the core 8 as illustrated in (a) of FIG. 8. Note that although the impression of unevenness T is depicted as being sparse in (a) of FIG. 10, this depiction done is merely to simplify the drawing. In actuality, the impression of unevenness T more densely covers the surface of the separator 12.

(b) of FIG. 10 is a cross-sectional view illustrating a cross section of the lithium-ion secondary battery 1 illustrated in (a) of FIG. 10, the cross section being orthogonal to direction D. (b) of FIG. 10 depicts the winding core 19 and one layer of the separator 12. In the cross section, the impression of unevenness T exists as a point on the one layer of the separator 12. Similarly, the impression of unevenness T exists as a point on each other layer (not shown) of the separator 12.

As illustrated in (a) of FIG. 3, lithium ions 3 move, through pores P of the separator 12, in a thickness-wise direction of the separator 12, i.e., in a direction orthogonal to direction D. The impression of unevenness T can, however, inhibit movement of the lithium ions 3.

In the cross section orthogonal to direction D as shown in (b) of FIG. 10, the impression of unevenness T exists as a point on each layer of the separator 12. This makes it possible for the lithium ions 3 to move, in a thickness-wise direction of the separator 12, through those of the pores P formed in a position on the separator 12 in which position the impression of unevenness T does not exist.

Winding of the separator 12 around the core B causes a pattern of the groove of the outer circumferential surface S of the core 8 to be transferred to the separator 12 as the impression of unevenness T. However in a cross section, orthogonal to direction D, of the lithium-ion secondary battery 1 illustrated in (a) of FIG. 10, the impression of unevenness T thus transferred exists merely as a single point on the separator 12. This renders uniform the flow of lithium ions 3 in the lithium-ion secondary battery 1 as a whole.

(Comparative Example of Groove Configuration)

(c) of FIG. 10 illustrates a configuration in which a plurality of impressions of unevenness Tas Tb, etc. are formed on the separator 12 of the lithium-ion secondary battery 1. (d) of FIG. 10 is a cross-sectional view illustrating a cross section of the lithium-ion secondary battery 1 illustrated in (c) of FIG. 10, the cross section being orthogonal to direction D. Note that although the impressions of unevenness Ta, Tb, etc. are depicted as being sparse in (c) of FIG. 10, this depiction done is merely to simplify the drawing. In actuality, the impressions of unevenness Ta, Tb, etc. more densely cover the surface of the separator 12.

In the cross section orthogonal to direction D as shown in (d) of FIG. 10, an impression of unevenness Tx exists on each layer of the separator 12, the impression of unevenness Tx being one of the plurality of impressions of unevenness Ta, Tb, etc. This can render non-uniform the flow of lithium ions 3 in the lithium-ion secondary battery 1 as a whole.

(Method for Producing Separator Roll)

The present invention also encompasses a method for producing a separator roll, the method including the steps of: preparing a core 8 such that, as shown in (a) of FIG. 8, a groove is formed on the outer circumferential surface S of the core 8, the groove extending in a direction substantially equivalent to direction C; and winding a separator 12 around the outer circumferential surface S as illustrated in (a) of FIG. 6. This method makes it possible to provide a separator roll suited for conveyance and battery production.

(Recap)

A core in accordance with a first aspect of the present invention is a core for allowing a battery separator to be wound around an outer circumferential surface thereof, including: a groove being formed on the outer circumferential surface so as to extend in a direction substantially equivalent to a circumferential direction of the outer circumferential surface; the core being made of resin.

With the above configuration, the direction in which the groove on the core extends (hereinafter, "groove direction") is substantially equivalent to the circumferential direction of the outer circumferential surface of the core. In comparison to a core having a groove extending in a widthwise direction (hereinafter, "core a"), the above configuration makes it possible to increase the coefficient of static friction produced between the core and the battery separator in a direction orthogonal to the circumferential direction of the outer circumferential surface of the core, i.e., a widthwise direction of the core. This renders a battery separator wound around the core less likely, in comparison to a separator wound around the core a, to move or become misaligned on the outer circumferential surface of the core in the widthwise direction of the core.

A separator roll according to a second aspect of the present invention includes the core according to the first aspect of the present invention and a battery separator wound around the outer circumferential surface of the core.

With the above configuration, the battery separator wound around the core is less likely, compared to a battery separator wound around core a, to move or become misaligned on the outer circumferential surface of the core, in the widthwise direction of the core. Thus, in comparison to a separator roll including the core a, the separator roll of the above configuration is better suited for conveyance and battery production.

The separator roll of the second aspect of the present invention is preferably arranged such that an average peak-to-peak distance, measured in a direction orthogonal to the circumferential direction of the outer circumferential surface, falls within a range from 50 µm to 500 µm.

The separator roll of the second aspect of the present invention is preferably arranged such that the average peak-to-peak distance is not greater than 250 µm.

The above configuration reduces transference of unevenness of the surface of the core to the battery separator wound therearound.

The above aspects of the present invention are preferably arranged such that the groove is formed in a spiral manner on the outer circumferential surface.

With the above configuration, in a case where a battery separator wound off from the core is used in a battery, it becomes possible to render uniform the flow of ions in the battery as a whole.

The separator roll of the second aspect of the present invention is preferably arranged such that a coefficient of static friction produced between the core and the battery separator and in a direction orthogonal to the circumferential direction falls in a range from 0.21 to 0.5.

A method for producing a separator roll in accordance with a third aspect of the present invention includes the steps of: (a) preparing a core such that a groove is formed on an outer circumferential surface of the core, the groove extending in a direction substantially equivalent to a circumferential direction of the outer circumferential surface; and (b) winding a battery separator around the outer circumferential surface.

The above method makes it possible to provide a separator roll suitable for conveyance and battery production.

[Additional Remarks]

The present invention is not limited to the embodiments, but can be altered by a skilled person in the art within the scope of the claims. An embodiment derived from a proper combination of technical means each disclosed in a different embodiment is also encompassed in the technical scope of the present invention.

Industrial Applicability

The present invention can also be used in (i) a film roll in which a general-purpose film other than a battery separator is wound around a core, (ii) a method for producing such a film roll, and (iii) a product that is not a lithium-ion secondary battery but is adaptable to a wide variety of general-purpose applications utilizing a film.

REFERENCE SIGNS LIST

1 Lithium-ion secondary battery (battery)
4 Heat-resistant layer (functional layer)
5 Porous film
8, u, 1 Core
10 Separator roll
11 Cathode
12 Separator (battery separator)
13 Anode
S Outer circumferential surface

The invention claimed is:

1. A core for allowing a battery separator to be wound around an outer circumferential surface thereof, comprising:

a groove being formed on the outer circumferential surface so as to extend in a direction substantially equivalent to a circumferential direction of the outer circumferential surface, wherein the groove comprises at least two groove portions formed on the outer circumferential surface of the core, wherein each groove portion has a peak when viewed in a cross-sectional view, and wherein an average distance between the peaks of two adjacent groove portions falls within a range from 50 μm to 500 μm, the core being made of resin.

2. A separator roll comprising:
the core as set forth in claim 1; and
a battery separator wound around the outer circumferential surface of the core.

3. The core as set forth in claim 1, wherein the average distance between the peaks is not greater than 250 μm.

4. The core as set forth in claim 1, wherein the groove is formed in a spiral manner on the outer circumferential surface.

5. The separator roll as set forth in claim 2, wherein a coefficient of static friction produced between the core and the battery separator and in a direction orthogonal to the circumferential direction falls in a range from 0.21 to 0.5.

6. A method for producing a separator roll, the method comprising the steps of:
(a) preparing a core such that a groove is formed on an outer circumferential surface of the core, the groove extending in a direction substantially equivalent to a circumferential direction of the outer circumferential surface; and
(b) winding a battery separator around the outer circumferential surface,
wherein the groove comprises at least two groove portions formed on the outer circumferential surface of the core, wherein each groove portion has a peak when viewed in a cross-sectional view, and wherein an average distance between the peaks of two adjacent groove portions falls within a range from 50 μm to 500 μm.

* * * * *